(12) United States Patent
Morioka

(10) Patent No.: US 9,939,594 B2
(45) Date of Patent: Apr. 10, 2018

(54) OPTICAL RECEPTACLE AND OPTICAL MODULE

(71) Applicant: Enplas Corporation, Saitama (JP)

(72) Inventor: Shimpei Morioka, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/500,394

(22) PCT Filed: Jul. 16, 2015

(86) PCT No.: PCT/JP2015/070351
§ 371 (c)(1),
(2) Date: Jan. 30, 2017

(87) PCT Pub. No.: WO2016/017433
PCT Pub. Date: Feb. 4, 2016

(65) Prior Publication Data
US 2017/0219786 A1    Aug. 3, 2017

(30) Foreign Application Priority Data

Jul. 31, 2014  (JP) ................................ 2014-156491

(51) Int. Cl.
*G02B 6/26* (2006.01)
*G02B 6/42* (2006.01)

(52) U.S. Cl.
CPC .......... *G02B 6/4239* (2013.01); *G02B 6/423* (2013.01); *G02B 6/4214* (2013.01);
(Continued)

(58) Field of Classification Search
None
See application file for complete search history.

(56) References Cited

U.S. PATENT DOCUMENTS 6,406,196 B1 * 6/2002 Uno .................. G02B 6/12007
   385/47
7,123,798 B2 * 10/2006 Fukuyama .......... G02B 6/3636
   385/47
(Continued)

FOREIGN PATENT DOCUMENTS

JP   2009-163212 A   7/2009
JP   2012-108443 A   6/2012
WO   2015/125729 A1  8/2015

OTHER PUBLICATIONS

International Search Report from International Application No. PCT/JP2015/070351 dated Oct. 13, 2015.

*Primary Examiner* — Sung Pak
(74) *Attorney, Agent, or Firm* — Brundidge & Stanger, P.C.

(57) ABSTRACT

This optical receptacle has the following: a concavity formed in a contact surface that contacts a substrate; a first optical surface, located at the bottom of said concavity, via which either light outputted from a photoelectric conversion element is inputted or light that is outputted from an end face of a light-transporting body and passes through the interior is outputted towards the photoelectric conversion element; a second optical surface via which either light that is inputted via the first optical surface and passes through the interior is outputted towards the end face of the light-transporting body or light outputted from the end face of the light-transporting body is inputted; a reflective surface, located in the path that light takes between the first optical surface and the second optical surface; and a connecting part that connects the interior of the concavity to the outside thereof.

6 Claims, 7 Drawing Sheets

(52) U.S. Cl.
CPC ......... *G02B 6/4244* (2013.01); *G02B 6/4249* (2013.01); *G02B 6/4257* (2013.01)

(56) References Cited

U.S. PATENT DOCUMENTS

| | | | | |
|---|---|---|---|---|
| 7,195,402 | B2* | 3/2007 | Fukuyama | G02B 6/4214 385/49 |
| 7,324,729 | B2* | 1/2008 | Fukuyama | G02B 6/4246 385/15 |
| 2009/0154877 | A1 | 6/2009 | Morioka | |
| 2013/0266260 | A1 | 10/2013 | Morioka et al. | |
| 2014/0241733 | A1* | 8/2014 | Moriyama | G02B 6/4206 398/138 |
| 2015/0355409 | A1* | 12/2015 | Yanagisawa | G02B 6/322 385/14 |
| 2016/0313517 | A1* | 10/2016 | Yamamoto | G02B 6/4214 |
| 2016/0313519 | A1* | 10/2016 | Yanagisawa | G02B 6/4244 |
| 2017/0059790 | A1* | 3/2017 | Koyama | G02B 6/421 |
| 2017/0123170 | A1* | 5/2017 | Furuya | G02B 6/421 |

* cited by examiner

US 9,939,594 B2

OPTICAL RECEPTACLE AND OPTICAL MODULE

TECHNICAL FIELD

The present invention relates to an optical receptacle and an optical module including the optical receptacle.

BACKGROUND ART

Conventionally, in optical communications using an optical transmission member such as an optical fiber and an optical waveguide, an optical module including a light emitting element such as a surface-emitting laser (for example, a vertical cavity surface emitting laser (VCSEL)) has been used. The optical module includes one or more photoelectric conversion elements (light emitting elements and light receiving elements), and a light coupling element for transmission or reception (hereinafter referred to also as "optical receptacle") (see, for example, PTL 1).

FIG. 1 illustrates a configuration of optical module 10 disclosed in PTL 1. FIGS. 2A to 2D illustrate a configuration of light coupling element 40 disclosed in PTL 1. FIG. 2A is a plan view of light coupling element 40, FIG. 2B is a bottom view of light coupling element 40, FIG. 2C is a front view of light coupling element 40, and FIG. 2D is a right side view of light coupling element 40.

As illustrated in FIG. 1, optical module 10 disclosed in PTL 1 includes substrate 20, photoelectric conversion element 30 disposed on substrate 20, and light coupling element 40 disposed on substrate 20. Substrate 20 includes substrate main body 21, and first positioning protrusion 22 disposed on substrate main body 21. As illustrated in FIGS. 2A to 2D, light coupling element 40 includes recess 41 disposed on the surface facing substrate 20, first lens surface 42 (incidence surface) on which light from photoelectric conversion element 30 is incident, total reflection surface 43 (reflection surface) configured to reflect light incident on first lens surface 42, second lens surface 44 (emission surface) configured to emit light reflected by total reflection surface 43 toward an end surface of optical fiber 50, second positioning protrusion 45 configured to set the position of optical fiber 50 with respect to light coupling element 40, and second positioning recess 46 configured to set the position of photoelectric conversion element 30 with respect to light coupling element 40 at substrate 20.

As illustrated in FIG. 1, at the time of assembling optical module 10 disclosed in PTL 1, first, second positioning recess 46 of light coupling element 40 is fit to first positioning protrusion 22 of substrate 20 on which photoelectric conversion element 30 is disposed. Next, first positioning recess 52 of ferrule 51 supporting optical fiber 50 is fit to second positioning protrusion 45 of light coupling element 40. In this manner, in optical module 10 disclosed in PTL 1, photoelectric conversion element 30 and optical fiber 50 are optically connected with each other.

CITATION LIST

Patent Literature

PTL 1
Japanese Patent Application Laid-Open No. 2009-163212

SUMMARY OF INVENTION

Technical Problem

As a way of surely fixing light coupling element 40 disclosed in PTL 1 to substrate 20, it is conceivable to use a thermosetting adhesive agent. For example, by applying and heat-curing an adhesive agent at the boundary between the side surface of optical module 10 and substrate 20, light coupling element 40 is fixed to substrate 20.

When light coupling element 40 disclosed in PTL 1 is fixed using a thermosetting adhesive agent, however, a heat curing process (heating) is performed in the state where recess 41 of light coupling element 40 is closed by substrate 20 and the adhesive agent, and consequently the air in recess 41 may possibly be expanded and the position of light coupling element 40 may possibly be shifted. Light coupling element 40 fixed at an inadequate position in the above-mentioned manner cannot appropriately couple photoelectric conversion element 30 and an end surface of optical fiber 50.

In view of this, an object of the present invention is to provide an optical receptacle which does not easily cause positional displacement even when fixed to the substrate by use of an adhesive agent. In addition, another object of the present invention is to provide an optical module including the optical receptacle.

Solution to Problem

An optical receptacle according to embodiments of the present invention is disposed between one or more photoelectric conversion elements disposed on a substrate and one or more optical transmission members, the optical receptacle being configured to optically couple the photoelectric conversion element and an end surface of the optical transmission member, and including: a recess formed on a contacting surface that makes contact with the substrate; one or more first optical surfaces disposed at an internal surface of the recess, the one or more first optical surfaces being configured to allow incidence of light emitted from the photoelectric conversion element, or emit, toward the photoelectric conversion element, light which is emitted from the end surface of the optical transmission member and advanced through an inside of the optical receptacle; one or more second optical surfaces configured to emit, toward the end surface of the optical transmission member, light which is incident on the first optical surface and advanced through the inside of the optical receptacle, or allow incidence of light emitted from the end surface of the optical transmission member; a reflection surface disposed on a light path of light between the first optical surface and the second optical surface, the reflection surface being configured to reflect, toward the second optical surface, light incident on the first optical surface, or reflect, toward the first optical surface, light incident on the second optical surface; and a communication part configured to communicate between an inside and an outside of the recess.

An optical module according to embodiments of the present invention includes: a substrate; one or more photoelectric conversion elements disposed on the substrate; and the optical receptacle fixed to the substrate such that the first optical surface faces the photoelectric conversion element. The optical receptacle is fixed to a surface of the substrate with an adhesive agent applied at a boundary between a side surface adjacent to the contacting surface and the substrate.

Advantageous Effects of Invention

According to the present invention, an optical receptacle which does not easily cause positional displacement even when fixed on a substrate with an adhesive agent can be provided. The optical receptacle according to the embodiments of the present invention can optically couple a photoelectric conversion element and an optical transmission member in an appropriate manner even when fixed on the substrate with an adhesive agent.

DESCRIPTION OF EMBODIMENTS

In the following, an optical receptacle and an optical module according to embodiments of the present invention will be described in detail with reference to the accompanying drawings.

Embodiment 1

(Configuration of Optical Module)

Figure 1:
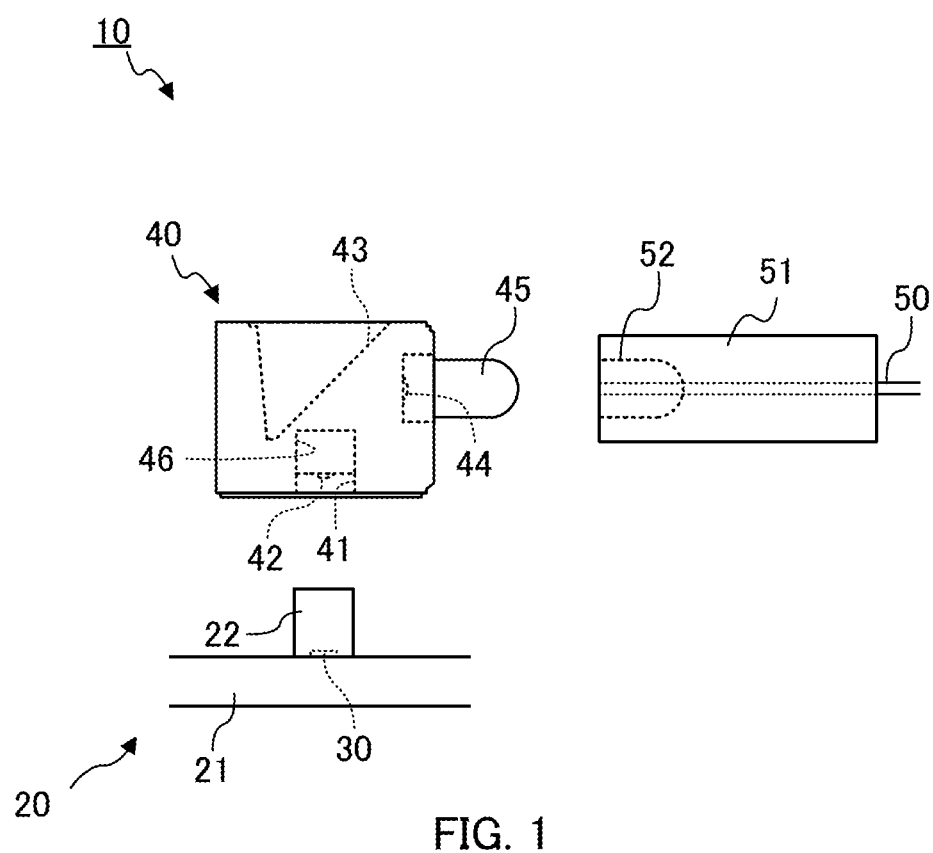
FIG. 1 illustrates a configuration of an optical module disclosed in PTL 1.
Figure 2A:
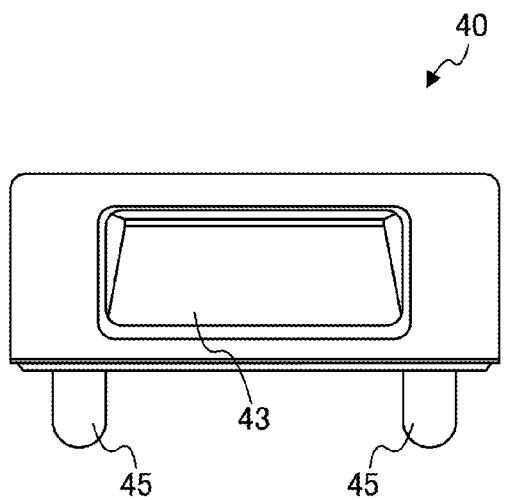
FIGS. 2A to 2D illustrate a configuration of a light coupling element disclosed in PTL 1.
Figure 2C:
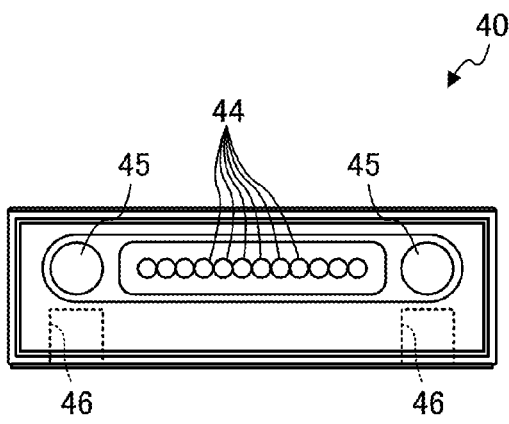
Figure 2B:
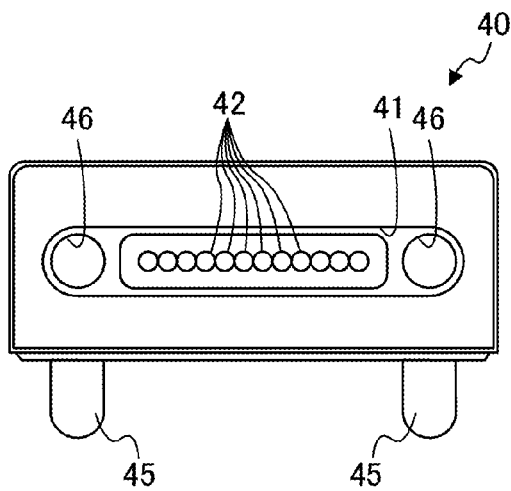
Figure 2D:
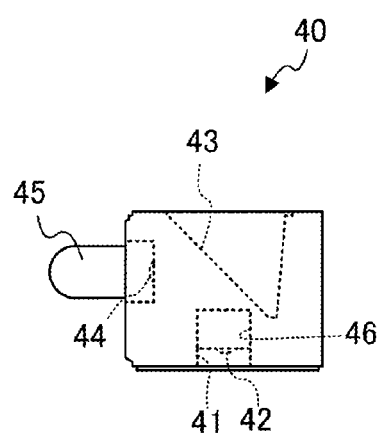
Figure 3:
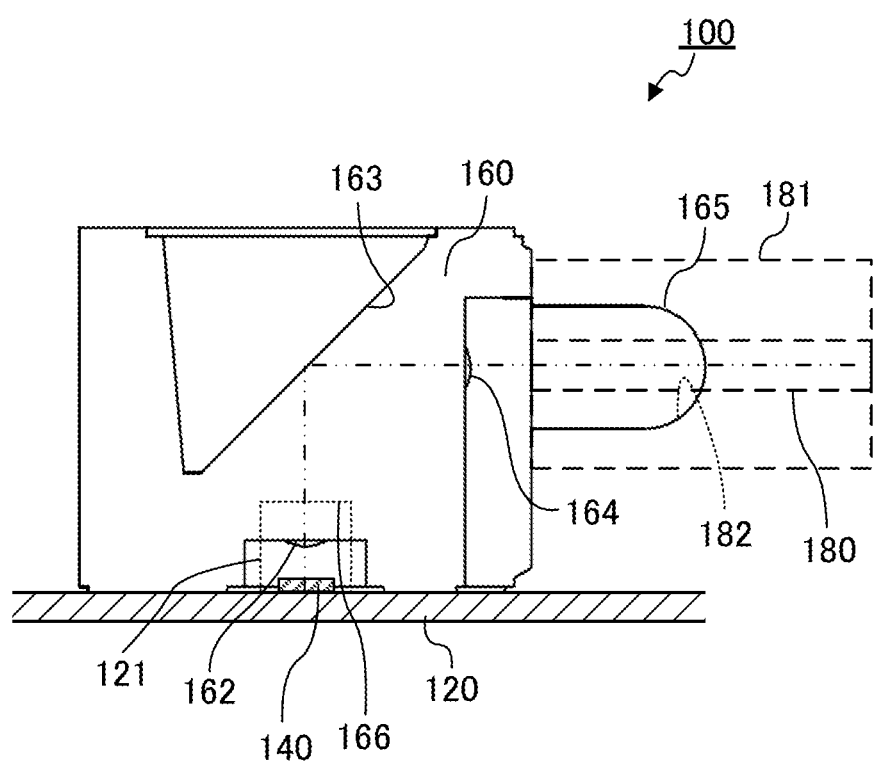
FIG. 3 illustrates a configuration of an optical module according to Embodiment 1.

FIG. 3 is a sectional view of optical module 100 according to Embodiment 1 of the present invention. In FIG. 3, the hatching of the cross section of optical receptacle 160 is omitted to illustrate light paths in optical receptacle 160.

As illustrated in FIG. 3, optical module 100 includes substrate 120, one or more photoelectric conversion elements 140, and optical receptacle 160. When optical module 100 is used, optical transmission member 180 is connected to optical receptacle 160.

One or more photoelectric conversion elements 140 and optical receptacle 160 are disposed on substrate 120. Substrate side protrusion 121 corresponding to positioning recess 166 of optical receptacle 160 described later is formed on substrate 120. By fitting positioning recess 166 to substrate side protrusion 121, it is possible to set the position of optical receptacle 160 at a predetermined position with respect to photoelectric conversion element 140 disposed on substrate 120. The material of substrate 120 is not limited. Substrate 120 is, for example, a glass composite substrate, a glass epoxy substrate or the like.

Photoelectric conversion element 140 is a light emitting element or a light receiving element, and is disposed on substrate 120. In the present embodiment, a plurality of (twelve) photoelectric conversion elements 140 (light emitting elements and/or light receiving elements) are disposed on substrate 120. In optical module 100 for transmission, light emitting element is used as photoelectric conversion element 140. In optical module 100 for reception, a light receiving element is used as photoelectric conversion element 140. The light emitting element is, for example, a vertical cavity surface emitting laser (VCSEL). The light receiving element is, for example, a photodetector.

Optical receptacle 160 is disposed on substrate 120 in such a manner as to face photoelectric conversion element 140. Disposed between photoelectric conversion element 140 and optical transmission member 180, optical receptacle 160 optically couples photoelectric conversion element 140 and an end surface of optical transmission member 180. In optical module 100 for transmission, optical receptacle 160 emits the light emitted from photoelectric conversion element 140 (light emitting element) toward an end surface of optical transmission member 180. In optical module 100 for reception, optical receptacle 160 emits the light emitted from an end surface of optical transmission member 180 toward photoelectric conversion element 140 (light receiving element). It is to be noted that optical module 100 including both the light emitting element and the light receiving element as photoelectric conversion element 140 functions as an optical module for transmission and an optical module for reception. The configuration of optical receptacle 160 is described later in detail.

The type of optical transmission member 180 is not limited. For example, optical transmission member 180 is an optical fiber, a light waveguide or the like. Optical transmission member 180 is connected with optical receptacle 160 through ferrule 181. In ferrule 181, ferrule side recess 182 corresponding to positioning protrusion 165 of optical receptacle 160 described later is formed. By fitting ferrule side recess 182 to positioning protrusion 165, an end surface of optical transmission member 180 can be fixed at a predetermined position with respect to optical receptacle 160. In the present embodiment, optical transmission member 180 is an optical fiber. In addition, the optical fiber may be of a single mode type, or a multiple mode type.

(Configuration of Optical Receptacle)

Figure 4A:
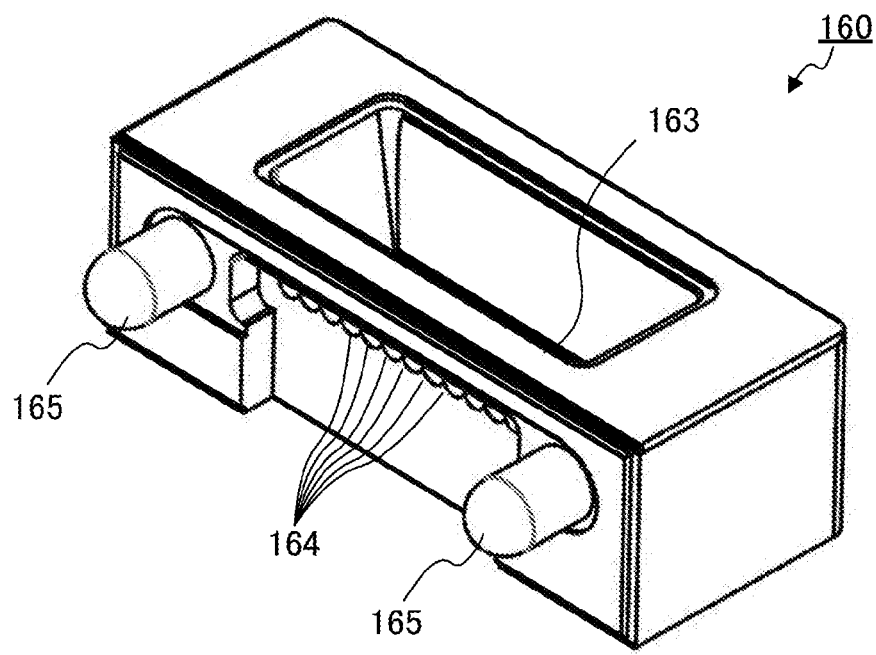
FIGS. 4A and 4B are perspective views of an optical receptacle according to Embodiment 1.
Figure 4B:
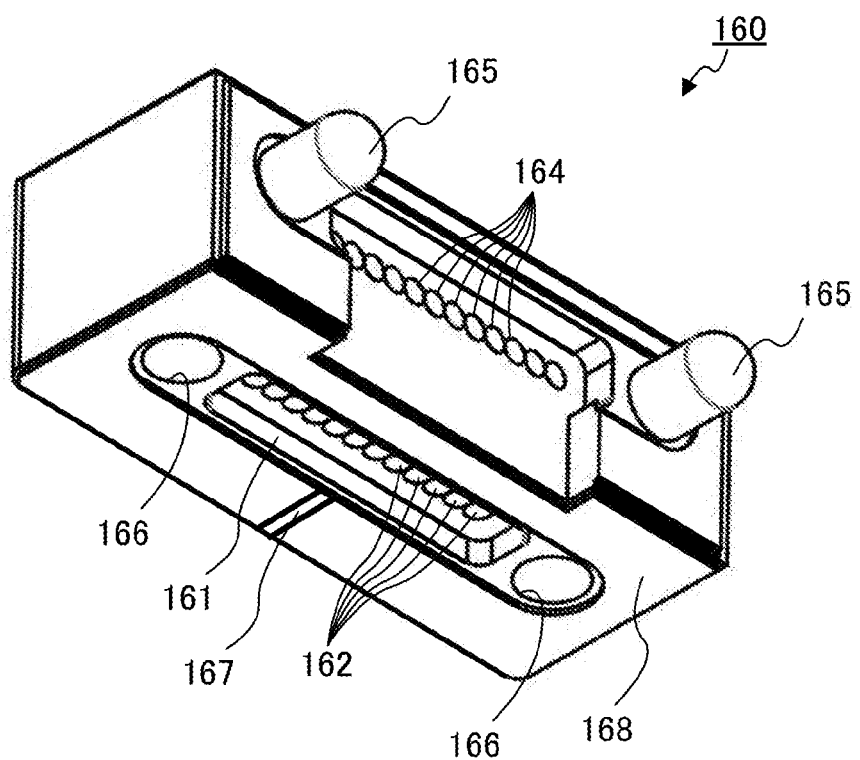
Figure 5A:
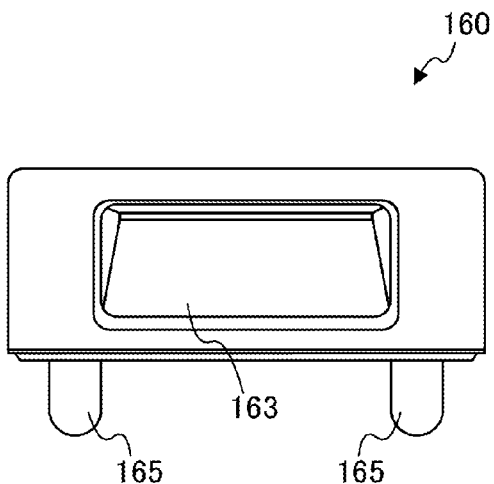
FIGS. 5A to 5D illustrate a configuration of the optical receptacle according to Embodiment 1.
Figure 5C:
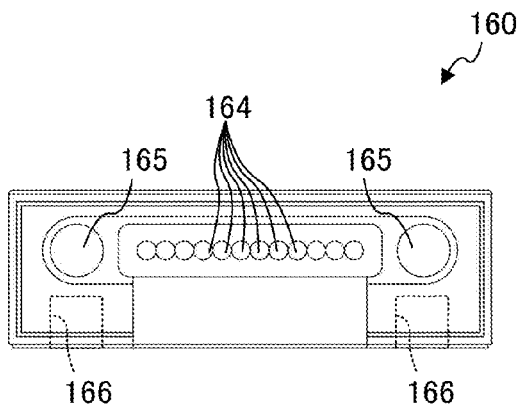
Figure 5B:
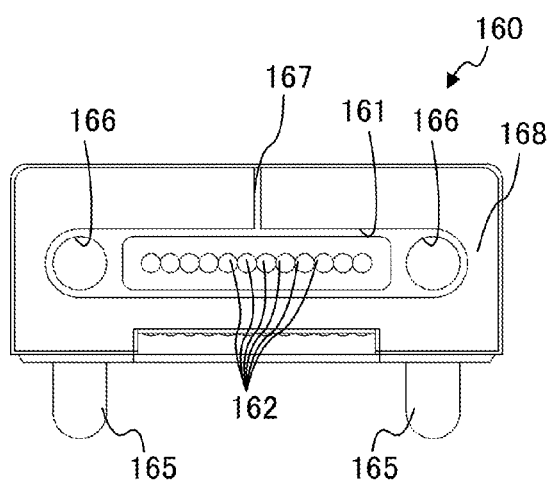
Figure 5D:
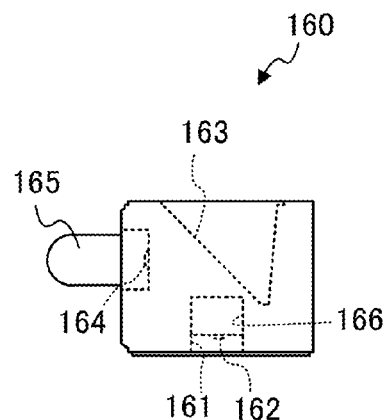

FIGS. 4A to 5D illustrate a configuration of optical receptacle 160 according to the embodiment. FIG. 4A is a perspective view of optical receptacle 160 according to the present embodiment as viewed from the upper side (top surface side), and FIG. 4B is a perspective view of optical receptacle 160 as viewed from the lower side (bottom surface side). FIG. 5A is a plan view of optical receptacle 160, FIG. 5B is a bottom view of optical receptacle 160, FIG. 5C is a front view of optical receptacle 160, and FIG. 5D is a side view of optical receptacle 160.

As illustrated in FIGS. 4A to 5D, optical receptacle 160 is a member having a substantially cuboid shape. Optical receptacle 160 includes housing part 161, first optical surface 162, third optical surface (reflection surface) 163, second optical surface 164, positioning protrusion 165, positioning recess 166 and communication part 167. Optical receptacle 160 is formed using a material which is transparent to light of wavelengths used in optical communications. Examples of the material of optical receptacle 160 include transparent resins such as polyetherimide (PEI) and cyclic olefin resin. In addition, optical receptacle 160 can be manufactured by injection molding, for example.

Housing part 161 is a space (recess) for housing photoelectric conversion element 140. Housing part 161 is disposed at a bottom surface that is contacting surface 168 configured to make contact with substrate 120. The position of housing part 161 in contacting surface 168 is not limited. For example, housing part 161 may be disposed at a center portion of contacting surface 168, or at a corner portion of contacting surface 168. In the present embodiment, housing part 161 is disposed at a center portion of contacting surface 168. In this case, contacting surface 168 is line-symmetric. The bottom surface of housing part 161 is parallel to the surface of substrate 120. Here, the "center" means a case where the margins (contacting surface 168) are equal to each other in the front-rear direction and the horizontal direction of optical receptacle 160.

First optical surface 162 is an optical surface that allows the light emitted from photoelectric conversion element 140 (light emitting element) to enter optical receptacle 160, or an optical surface that emits, toward photoelectric conversion element 140 (light receiving element), the light which is incident on second optical surface 164 and reflected by third optical surface 163. First optical surface 162 is disposed on the bottom surface of housing part 161 (recess) such that first optical surface 162 can face photoelectric conversion element 140. Two or more first optical surfaces 162 are disposed in one line in the long side direction on the bottom surface of housing part 161 in such a manner as to face photoelectric conversion element 140. In the present embodiment, twelve first optical surfaces 162 are disposed in one line. The shape of first optical surface 162 is not limited. In the present embodiment, first optical surface 162 has a shape of a convex lens protruding toward photoelectric conversion element 140. In addition, first optical surface 162 has a circular shape in plan view. Preferably, the central axis of first optical surface 162 is perpendicular to the light emitting surface or the light reception surface of photoelectric conversion element 140 (and the surface of substrate 120). In addition, preferably, the central axis of first optical surface 162 coincides with the light emitted from photoelectric conversion element 140 (light emitting element), or the optical axis of the light incident on photoelectric conversion element 140 (light receiving element). It is to be noted that the number of first optical surfaces 162 is not limited to two, and may be one.

Third optical surface 163 is an optical surface (reflection surface) that reflects light incident on first optical surface 162 toward second optical surface 164, or reflects light incident on second optical surface 164 toward first optical surface 162. Third optical surface 163 is tilted such that the distance to optical transmission member 180 (front surface side) decreases from the bottom surface toward the top surface of optical receptacle 160. The inclination angle of third optical surface 163 is not limited. In the present embodiment, the inclination angle of third optical surface 163 is 45 degrees to the optical axis of light incident on third optical surface 163. The shape of third optical surface 163 is not limited. In the present embodiment, third optical surface 163 has a planar shape. Light incident on first optical surface 162 or second optical surface 164 is incident on third optical surface 163 at an incident angle greater than the critical angle.

Second optical surface 164 is an optical surface that emits, toward an end surface of optical transmission member 180, the light which is incident on first optical surface 162 and reflected by third optical surface 163, or an optical surface that allows the light emitted from an end surface of optical transmission member 180 to enter optical receptacle 160. Two or more second optical surfaces 164 are disposed in one line in the long side direction in such a manner as to face an end surface of optical transmission member 180 at the front surface of optical receptacle 160. In the present embodiment, twelve second optical surfaces 164 are disposed in one line. The shape of second optical surface 164 is not limited. In the present embodiment, second optical surface 164 has a shape of a convex lens protruding toward an end surface of optical transmission member 180. Preferably, the central axis of second optical surface 164 coincides with the central axis of an end surface of optical transmission member 180. It is to be noted that the number of second optical surfaces 164 is not limited to two, and may be one.

Positioning protrusion 165 fixes an end surface of optical transmission member 180 at a desired position with respect to second optical surface 164. As described above, positioning protrusion 165 is fit to ferrule side recess 182 formed in ferrule 181 of optical transmission member 180. The shape and the size of positioning protrusion 165 are not limited as long as the above-mentioned effect can be ensured.

Positioning recess 166 fixes first optical surface 162 at a desired position with respect to photoelectric conversion element 140. Substrate side protrusion 121 formed in substrate 120 is fit to positioning recess 166 as described above. The shape and the size of positioning recess 166 are not limited as long as the above-mentioned effect can be ensured. In the present embodiment, positioning recess 166 is a recess having a substantially columnar shape.

Communication part 167 communicates between the inside and the outside of housing part 161. The shape of communication part 167 is not limited as long as the above-described function can be ensured. Examples of the shape of communication part 167 include a communication groove and a communication hole which open at the internal surface of housing part 161 and exterior surface adjacent to contacting surface 168. In the present embodiment, communication part 167 is a communication groove which is disposed at contacting surface 168 in such a manner as to open at the internal surface of housing part 161 and the exterior surface adjacent to contacting surface 168. The position of communication groove in contacting surface 168 is not limited. In the present embodiment, the communication groove is disposed to connect a center portion of housing part 161 in the long side direction and a lowermost center portion in the long side direction of the back surface adjacent to contacting surface 168. That is, the communication groove is disposed to linearly extend such that the central axis thereof passes through the center of housing part 161. The cross-sectional shape of the communication groove is not limited. The communication groove may have a triangular shape or a rectangular shape in cross section. In the present embodiment, the communication groove has a rectangular shape in cross section. Also, the cross-sectional area of communication groove is not limited. Preferably, the cross-sectional area is set to a size such that the communication groove serves as a path of gas but not as a path of liquid. The width of the communication groove may be identical or different between housing part 161 side and the exterior surface side adjacent to contacting surface 168. In the present embodiment, the width of the communication groove is constant.

Next, the light path in optical module 100 according to the present embodiment is described. When optical receptacle 160 is used in optical module 100 for transmission, the light emitted from photoelectric conversion element 140 (light emitting element) enters optical receptacle 160 from first optical surface 162. At this time, the light having entered optical receptacle 160 is converted into collimate light by first optical surface 162, and is advanced toward third optical surface 163. Next, the light having entered optical receptacle 160 is reflected by third optical surface 163, and is emitted toward second optical surface 164. The light reflected by third optical surface 163 and emitted out of optical receptacle 160 from second optical surface 164 reaches an end surface of optical transmission member 180 while converging.

When optical receptacle 160 is used in optical module 100 for reception, the light emitted from an end surface of optical transmission member 180 enters optical receptacle 160 from second optical surface 164. At this time, the light having entered optical receptacle 160 is converted into collimate light by third optical surface 163, and is advanced toward third optical surface 163. Next, the light having entered optical receptacle 160 is reflected by third optical surface 163, and emitted toward first optical surface 162. The light reflected by third optical surface 163 and emitted out of optical receptacle 160 from first optical surface 162 reaches photoelectric conversion element 140 (light receiving element) while converging.

(Assembling Method of Optical Module)

An assembling method of optical module 100 according to the present embodiment is not limited. For example, optical module 100 can be assembled by fixing optical receptacle 160 by use of a thermosetting adhesive agent after fixing photoelectric conversion element 140 on substrate 120.

First, photoelectric conversion element 140 is fixed at a predetermined position of substrate 120. To be more specific, photoelectric conversion elements 140 are disposed to face respective first optical surfaces 162 of optical receptacle 160. Next, optical receptacle 160 is placed on substrate 120 on which photoelectric conversion element 140 is disposed. To be more specific, positioning recess 166 of optical receptacle 160 is fit to substrate side protrusion 121 of substrate 120. In this manner, optical receptacle 160 can be disposed such that the central axis of photoelectric conversion element 140 and the central axis of first optical surface 162 coincide with each other.

Next, an adhesive agent made of a thermosetting resin material is applied at a boundary portion between the surface of substrate 120 and the exterior surface (the front surface, the back surface, the right side surface and the left side surface) adjacent to contacting surface 168 (bottom surface) except for the portion where the communication groove opens. Thereafter, a heat curing process is performed at a predetermined temperature for a predetermined time. It is to be noted that, in the present embodiment, in the case where Ablestik BF-4 (Henkel Japan Corporation) is used as the heat curable adhesive agent, the temperature for the heat curing process is about 100 degrees, and the duration for the heat curing process is about 30 minutes.

At this time, although the adhesive agent immediately after the application slightly intrudes between the surface of substrate 120 and contacting surface 168, almost no adhesive agent enters housing part 161 from the opening of the communication groove. In addition, in the heat curing process, the air in housing part 161 is expanded and ejected to the outside via the communication groove, and therefore, no adhesive agent enters housing part 161 through the communication groove. It is to be noted that the amount of the adhesive agent existing between the surface of substrate 120 and the contacting surface is significantly small, and therefore the performance of optical module 100 is not influenced.

Through the above-mentioned processes, optical module 100 according to the present embodiment is assembled.

(Effect)

Optical receptacle 160 according to the present embodiment includes communication part 167 that is formed on contacting surface (bottom surface) 168 that makes contact with the surface of substrate 120, and is configured to communicate between the inside and the outside of housing part 161. With this configuration, in the heat curing process, the air in housing part 161 is ejected to the outside through communication part 167. In addition, since optical receptacle 160 is not partially separated from substrate 120, positional displacement of the optical receptacle 160 does not occur unlike the conventional techniques. Thus, since installation accuracy of optical receptacle 160 with respect to substrate 120 is high in optical module 100 according to the present embodiment, photoelectric conversion element 140 and optical transmission member 180 can be optically coupled to each other in an appropriate manner.

Figure 6:
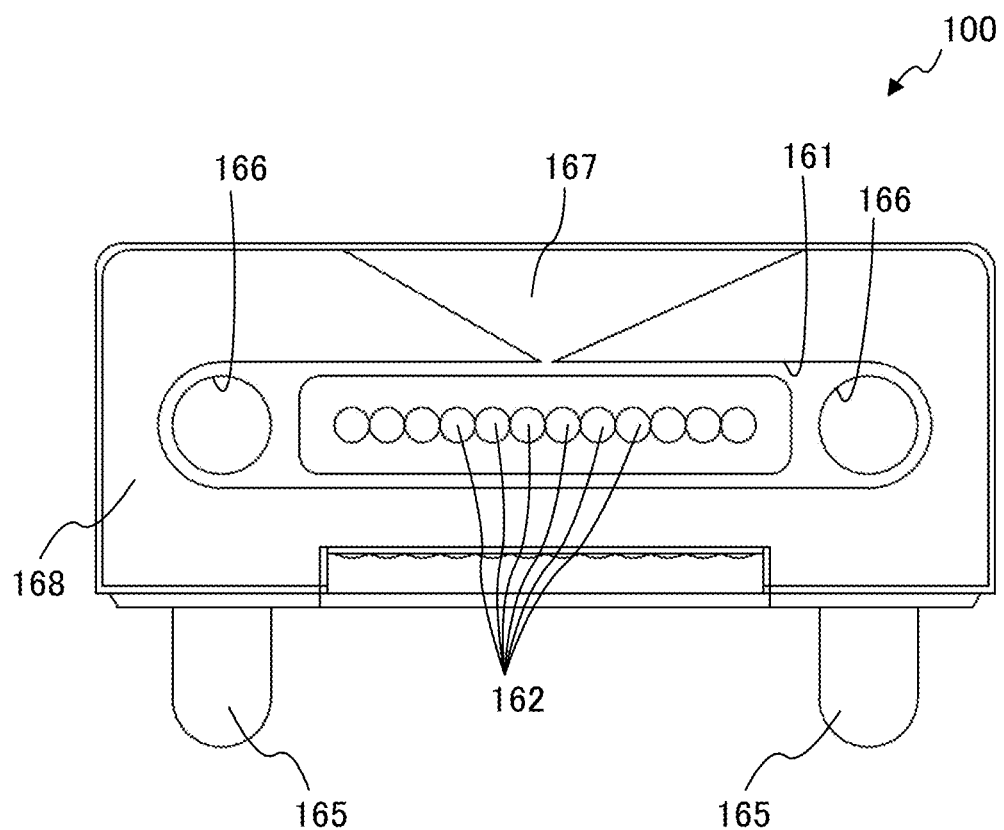
FIG. 6 is a bottom view of an optical receptacle according to a modification of Embodiment 1.

As described above, the shape of communication part 167 is not limited. FIG. 6 is a bottom view of optical receptacle 160 according to a modification of Embodiment 1. As illustrated in FIG. 6, the communication groove may be formed such that the width thereof is small on housing part 161 side and is increased toward the exterior surface adjacent to contacting surface 168. In this case, the opening of the communication groove is not closed with the adhesive agent. In addition, even when the adhesive agent reaches the opening edge of the communication groove, the optical characteristics are not influenced by the adhesive agent having reached first optical surface 162 since the distance to first optical surface 162 is long.

Embodiment 2

(Configuration of Optical Module)

An optical module according to Embodiment 2 is different from optical module 100 according to Embodiment 1 only in configuration of optical receptacle 260. Therefore, the configurations identical to those of optical module 100 according to Embodiment 1 are denoted with the same reference numerals, and the description thereof will be omitted.

Figure 7A:
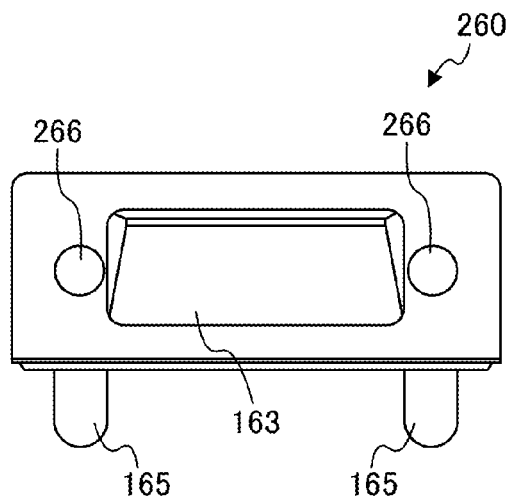
FIGS. 7A to 7D illustrate a configuration of an optical receptacle according to Embodiment 2.
Figure 7C:
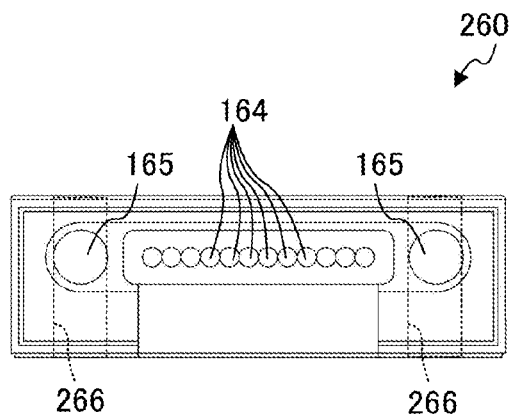
Figure 7B:
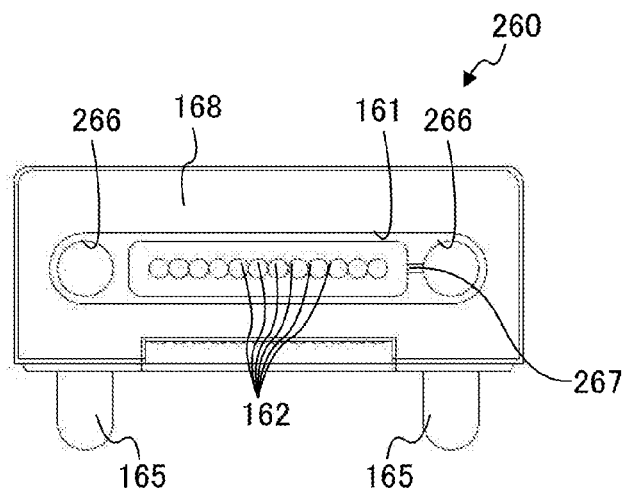
Figure 7D:
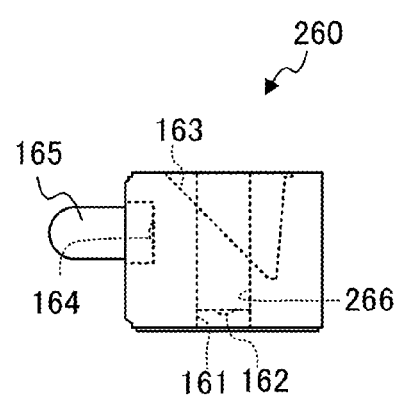

FIGS. 7A to 7D illustrate a configuration of optical receptacle 260 according to Embodiment 2. FIG. 7A is a plan view of optical receptacle 260, FIG. 7B is a bottom view of optical receptacle 260, FIG. 7C is a front view of optical receptacle 260, and FIG. 7D is a side view of optical receptacle 260.

The optical module according to Embodiment 2 includes substrate 120, photoelectric conversion element 140 and optical receptacle 260.

(Configuration of Optical Receptacle)

Optical receptacle 260 includes housing part 161, first optical surface 162, third optical surface 163 (reflection surface), second optical surface 164, positioning protrusion 165, positioning recess 266 and communication part 267.

Positioning recess 266 is a through hole that opens at the top surface and contacting surface 168 (bottom surface) of optical receptacle 260.

Communication part 267 is a communication groove that communicates between the inside and the outside of housing part 161. In the present embodiment, the communication groove is disposed to connect a center portion of housing part 161 in the short side direction and the internal surface of positioning recess 266 (the exterior surface adjacent to contacting surface 168). In this case, one communication groove may be disposed at one end portion of housing part 161 in the long side direction, or two communication grooves may be disposed at both ends of housing part 161 in the long side direction. In the present embodiment, one communication groove is disposed at one end portion of housing part 161 in the long side direction.

In an assembling method of the optical module according to Embodiment 2, after photoelectric conversion element 140 is disposed to substrate 120, positioning recess 266 of optical receptacle 260 is fit to substrate side protrusion 121 of substrate 120. Next, an adhesive agent made of a thermosetting resin material is applied to the boundary between the surface of substrate 120 and the exterior surface adjacent to contacting surface 168 (the front surface, the back surface, the right side surface and the left side surface), and thereafter a heat curing process is performed at a predetermined temperature for a predetermined time. At this time, no adhesive agent immediately after the application enters housing part 161. In addition, the air expanded in housing part 161 is ejected to the outside from the through hole via the communication groove.

(Effect)

The optical module according to Embodiment 2 has an effect similar to that of optical module 100 according to Embodiment 1.

While first optical surface 162 and second optical surface 164 are convex lenses in optical receptacles 160 and 260 according to the embodiments, first optical surface 162 and second optical surface 164 may be planar surfaces. To be more specific, only first optical surface 162 may be a planar surface, or only second optical surface 164 may be a planar surface. When first optical surface 162 is formed as a planar surface, third optical surface 163 is formed such that third optical surface 163 can function as a recessed surface mirror for example. In addition, when the light immediately before reaching second optical surface 164 effectively converges with first optical surface 162, third optical surface 163 and the like, second optical surface 164 may be formed as a plane. It is to be noted that, in this case, the reference position of first optical surface 162 is not limited.

While optical receptacles 160 and 260 are used in optical module 100 for transmission or for reception in the above-mentioned embodiments, optical module 100 according to the embodiments of the present invention may be used in an optical module for transmission and reception. In this case, the optical module includes a light emitting element and a light receiving element as a plurality of photoelectric conversion elements.

This application is entitled to and claims the benefit of Japanese Patent Application No. 2014-156491 filed on Jul. 31, 2014, the disclosure each of which including the specification, drawings and abstract is incorporated herein by reference in its entirety.

INDUSTRIAL APPLICABILITY

The optical receptacle and the optical module according to the embodiments of the present invention are suitable for optical communications using an optical transmission member.

REFERENCE SIGNS LIST

10 Optical module
20 Substrate
21 Substrate main body
22 First positioning protrusion
30 Photoelectric conversion element
40 Light coupling element
41 Recess
42 First lens surface
43 Reflection surface
44 Second lens surface
45 Second positioning protrusion
46 Second positioning recess
50 Optical fiber
51 Ferrule
52 First positioning recess
100 Optical module
120 Substrate
121 Substrate side protrusion
140 Photoelectric conversion element
160, 260 Optical receptacle
161 Housing part (recess)
162 First optical surface
163 Third optical surface
164 Second optical surface
165 Positioning protrusion
166, 266 Positioning recess
167, 267 Communication part
168 Contacting surface
180 Optical transmission member
181 Ferrule
182 Ferrule side recess

The invention claimed is:

1. An optical receptacle to be disposed between one or more photoelectric conversion elements disposed on a substrate and one or more optical transmission members, the optical receptacle being configured to optically couple the photoelectric conversion element and an end surface of the optical transmission member, and comprising:

a recess formed on a contacting surface that makes contact with the substrate, the recess being surrounded by the contacting surface in both a front-rear direction and a right-left direction of the optical receptacle;

one or more first optical surfaces disposed at an internal surface of the recess, the one or more first optical surfaces being configured to allow incidence of light emitted from the photoelectric conversion element, or emit, toward the photoelectric conversion element, light which is emitted from the end surface of the optical transmission member and advanced through an inside of the optical receptacle;

one or more second optical surfaces configured to emit, toward the end surface of the optical transmission member, light which is incident on the one or more first optical surfaces and advanced through the inside of the optical receptacle, or allow incidence of light emitted from the end surface of the optical transmission member;

a reflection surface disposed on a light path of light between the one or more first optical surfaces and the one or more second optical surfaces, the reflection surface being configured to reflect, toward the one or more second optical surfaces, light incident on the one or more first optical surfaces, or reflect, toward the one or more first optical surfaces, light incident on the one or more second optical surfaces; and a communication part configured to communicate between an inside and an outside of the recess.

2. The optical receptacle according to claim 1, wherein the communication part is a communication groove formed on the contacting surface to open at the internal surface of the recess and an exterior surface adjacent to the contacting surface.

3. The optical receptacle according to claim 2, wherein the contacting surface is line-symmetric.

4. An optical module comprising:
a substrate;
one or more photoelectric conversion elements disposed on the substrate; and
the optical receptacle according to claim 1 fixed to the substrate such that the one or more first optical surfaces faces the one or more photoelectric conversion elements, wherein
the optical receptacle is fixed to a surface of the substrate with an adhesive agent applied at a boundary between a side surface adjacent to the contacting surface and the substrate.

5. An optical module comprising:

a substrate;

one or more photoelectric conversion elements disposed on the substrate; and the optical receptacle according to claim 2 fixed to the substrate such that the one or more first optical surfaces faces the one or more photoelectric conversion elements, wherein the optical receptacle is fixed to a surface of the substrate with an adhesive agent applied at a boundary between a side surface adjacent to the contacting surface and the substrate.

6. An optical module comprising:

a substrate;

one or more photoelectric conversion elements disposed on the substrate; and the optical receptacle according to claim 3 fixed to the substrate such that the one or more first optical surfaces faces the one or more photoelectric conversion elements, wherein the optical receptacle is fixed to a surface of the substrate with an adhesive agent applied at a boundary between a side surface adjacent to the contacting surface and the substrate.

* * * * *